United States Patent
McGill et al.

(10) Patent No.: US 11,635,742 B2
(45) Date of Patent: Apr. 25, 2023

(54) TECHNOLOGIES FOR FAULT RELATED VISUAL CONTENT

(71) Applicant: Enertiv Inc., New York, NY (US)

(72) Inventors: Connell J. McGill, New York, NY (US); Pavel Khodorkovskiy, New York, NY (US); Felix Lipov, New York, NY (US)

(73) Assignee: Enertiv Inc., New York, NY (US)

( * ) Notice: Subject to any disclaimer, the term of this patent is extended or adjusted under 35 U.S.C. 154(b) by 288 days.

(21) Appl. No.: 16/769,982

(22) PCT Filed: Dec. 4, 2018

(86) PCT No.: PCT/US2018/063943
§ 371 (c)(1),
(2) Date: Jun. 4, 2020

(87) PCT Pub. No.: WO2019/113134
PCT Pub. Date: Jun. 13, 2019

(65) Prior Publication Data
US 2020/0387127 A1    Dec. 10, 2020

Related U.S. Application Data

(60) Provisional application No. 62/594,411, filed on Dec. 4, 2017.

(51) Int. Cl.
*G06F 9/44* (2018.01)
*G06Q 10/00* (2012.01)
(Continued)

(52) U.S. Cl.
CPC ..... *G05B 19/0423* (2013.01); *G06F 16/2379* (2019.01); *G06V 20/20* (2022.01);
(Continued)

(58) Field of Classification Search
CPC ...... G05B 19/0423; G05B 2219/32014; G05B 2219/39449; G06F 16/2379; G06V 20/20
See application file for complete search history.

(56) References Cited

U.S. PATENT DOCUMENTS 10,210,767 B2 *  2/2019  Johansen ............... G06Q 10/00
10,645,092 B1 *  5/2020  Bonar ..................... G06V 20/70
(Continued)

FOREIGN PATENT DOCUMENTS

JP        2006209594         8/2006

OTHER PUBLICATIONS

Sanches et al., Aspects of User Profiles That Can Improve Mobile Augmented Reality Usage, 7 pages (Year: 2017).*
Gao et al., Research on Visual Monitoring and Auxiliary Maintenance Technology of Equipment Based on Augmented Reality, 2019 11th International Conference on Intelligent Human-Machine Systems and Cybernetics (IHMSC), (5 pages).
(Continued)

*Primary Examiner* — Thuy Dao
(74) *Attorney, Agent, or Firm* — Dentons US LLP

(57) ABSTRACT

This technology enables a receipt of a plurality of readings from a sensor monitoring a piece of equipment in a building. The receipt enables an identification of a present fault or a projected fault in the piece of equipment. The identification enables a generation of an augmented reality content related to the present fault or the projected fault. The augmented reality content is sent to a mobile device when the mobile device is in proximity of the piece of equipment.

34 Claims, 17 Drawing Sheets

(51) Int. Cl.
*G06F 9/455* (2018.01)
*G09B 5/02* (2006.01)
*G05B 19/042* (2006.01)
*G06F 16/23* (2019.01)
*G06V 20/20* (2022.01)

(52) U.S. Cl.
CPC .............. *G05B 2219/32014* (2013.01); *G05B 2219/39449* (2013.01)

(56) References Cited

U.S. PATENT DOCUMENTS

| | | |
|---|---|---|
| 11,128,540 B1 | 9/2021 | Bertz |
| 2011/0115816 A1 | 5/2011 | Brackney |
| 2016/0162772 A1 | 6/2016 | Curtis |
| 2016/0327293 A1 | 11/2016 | Grabowski et al. |
| 2017/0269617 A1 | 9/2017 | Daoud et al. |
| 2019/0236844 A1 | 8/2019 | Balasian |
| 2020/0026257 A1 | 1/2020 | Dalal |
| 2020/0034622 A1 | 1/2020 | Thakurta |
| 2020/0151450 A1 | 5/2020 | Hishinuma |
| 2021/0201542 A1 | 7/2021 | Yuan |
| 2022/0188545 A1 | 6/2022 | Nagar |

OTHER PUBLICATIONS

International Search Report and Written Opinion dated Feb. 11, 2019 in related International Application No. PCT/US18/63943 filed Apr. 3, 2019 (8 pages).
Jang et al., Building Energy Management System Based on Mixed Reality for Intuitive Interface, 2019 IEEE 2nd International Conference on Electronics Technology (ICET), (4 pages).
Ling et al., Project Kappa: An augmented-reality based sensor data crowdsourcing platform for environmental monitoring, 2021 IEEE International Conference on Sensors and Nanotechnology (SEN-NANO), (4 pages).
Lock et al., HoloCity—exploring the use of augmented reality cityscapes for collaborative understanding of high-volume urban sensor data, VRCAI '19: The 17th International Conference on Virtual-Reality Continuum and its Applications in Industry, Nov. 2019, Article 45, (2 pages).
Natephra et al., Live Data Visualization of IoT Sensors Using Augmented Reality (AR) and BIM, 36th ISARC 2019, (7 pages).
Tagami et al., LESAR: Localization System for Environmental Sensors using Augmented Reality, 2020 IEEE 44th Annual Computers, Software, and Applications Conference (COMPSAC), (6 pages).

* cited by examiner

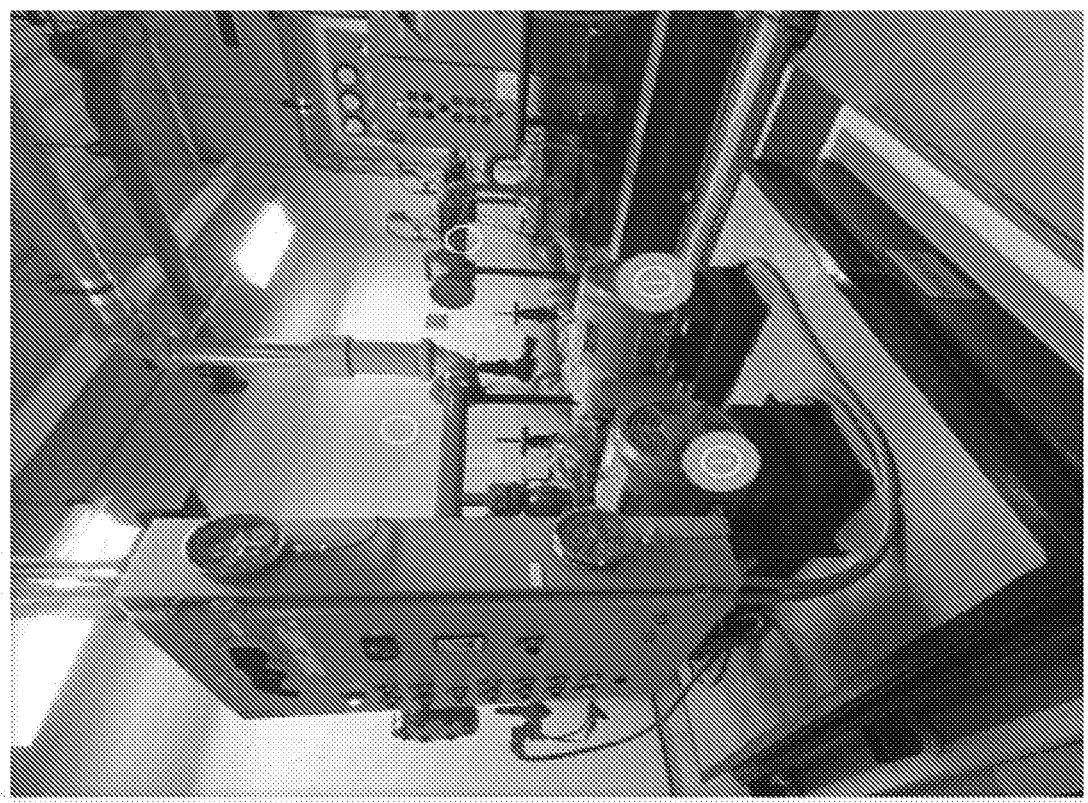
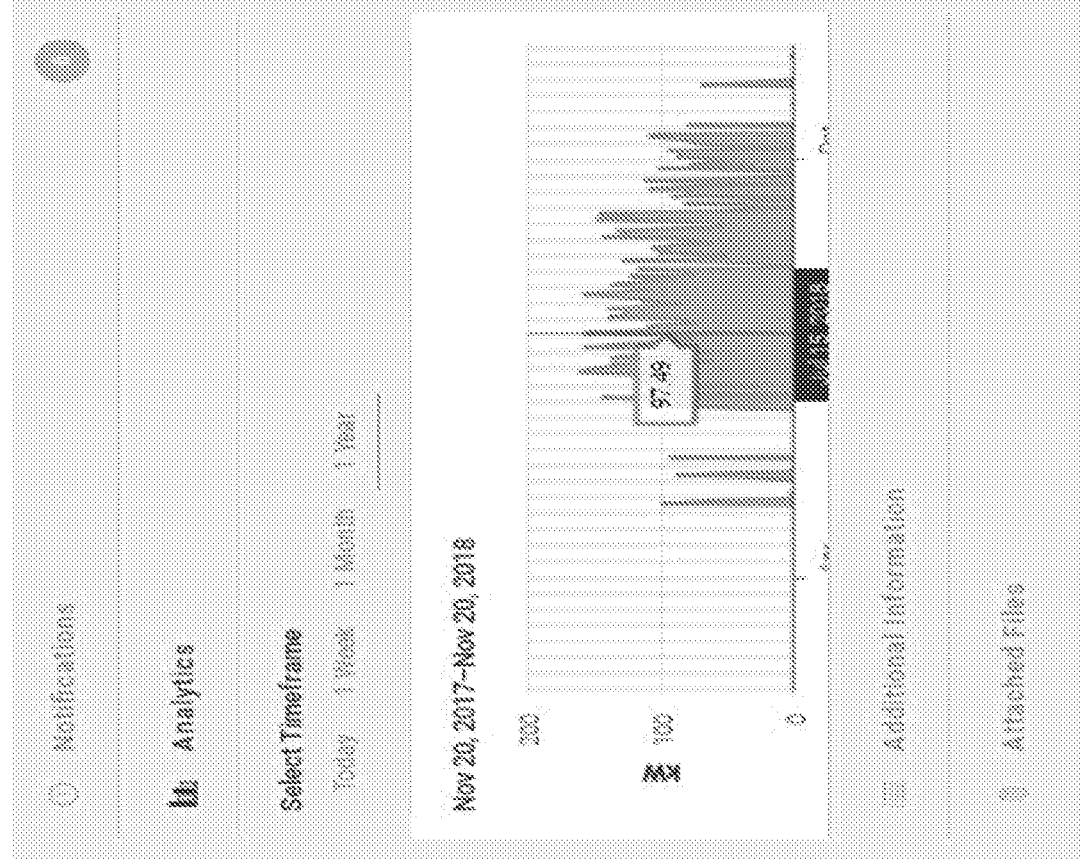
Fig. 4

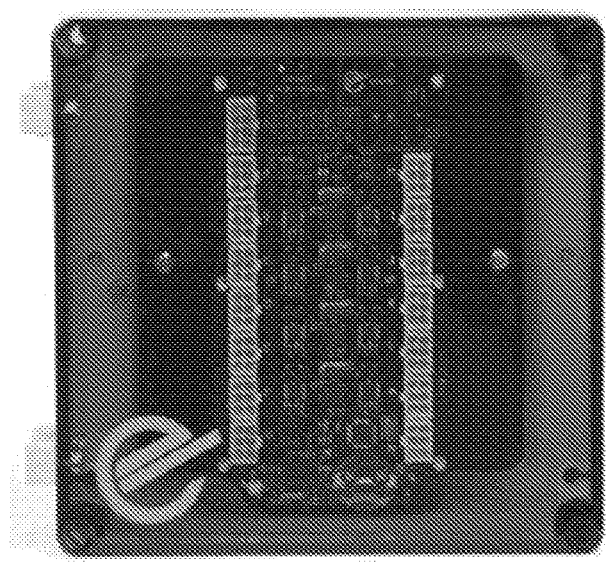

802

Technical Specifications

| General | |
|---|---|
| Service | Single Phase, 3 Phase - 4 Wire (WYE) |
| Measurement Type | Current (A), Voltage (V), Power Factor, Frequency (Hz), Power (kW, kVA, kVAR) |
| Measurement Range | 0-5,000A, 100-300VAC Line-to-Neutral |
| Input Channels | 42 |
| Sampling Frequency | 500Hz |
| Update Rate | 1s |
| Measurement Accuracy | ±1% at full range |
| Storage | 3 months of offline storage |
| Indicators | 1. Blue LED: Collecting Data<br>2. Red LED: Power |

| Communications | |
|---|---|
| Type | Ethernet |
| Port | RJ-45 |
| Communication Rate | 10/100Mbps |

| Power | |
|---|---|
| Input Voltage (Current) | 100-300VAC - (30mA) |
| Frequency | 50-60Hz |
| Power Consumption | 3W |

| Environmental | |
|---|---|
| Operating Temperature | 32°-122°F (0°-50°C) |
| Storage Temperature | -4°-158°F (-20°-70°C) |
| Humidity | <85% RH, non-condensing |
| Enclosure | IP66 (NEMA Type: 4X), Polycarbonate, Transparent Cover |
| Weight | 2lbs (907.2g) |
| Dimensions | 7.09" x 7.17" x 3.54"<br>(180mm x 182mm x 90mm) |

TECHNOLOGIES FOR FAULT RELATED VISUAL CONTENT

CROSS-REFERENCE TO RELATED APPLICATIONS

This application claims the benefit of PCT International Application No. PCT/US18/63943 filed 4 Dec. 2018; which claims the benefit of U.S. Provisional Patent Application Ser. No. 62/594,411 filed 4 Dec. 2017; each of which is herein incorporated by reference in its entirety for all purposes.

TECHNICAL FIELD

Generally, this disclosure relates to building maintenance. Specifically, this disclosure relates to various technologies for fault related augmented reality (AR) content.

BACKGROUND

A building can contain a piece of equipment (e.g. boiler, pump, elevator machinery, generator) affixed thereto for use (e.g. plumbing, electrical, climate) by a tenant of the building. Because of normal wear and tear, the piece of equipment can be maintained (e.g. oiled, tuned, repaired) based on a recommended maintenance schedule or reactive to a tenant or visitor complaint. This form of equipment maintenance is inefficient (e.g. equipment down before or after maintenance, building unusable during maintenance, not proactive maintenance). Further, the piece of equipment can be maintained by an inexperienced maintenance person when guided by an experienced maintenance person. This form of equipment maintenance is also inefficient (e.g. labor costs, scheduling, prioritization).

SUMMARY

In an embodiment, a method comprises: populating, via a server, a user profile with a building identifier, a piece of equipment identifier, and a sensor identifier such that the building identifier is associated with the piece of equipment identifier in a one-to-many correspondence and the building identifier is associated with the sensor identifier in a one-to-many correspondence; receiving, via the server, in real-time, a plurality of readings from a sensor monitoring a piece of equipment, wherein the sensor and the piece of equipment are stationary within a building, wherein the building identifier identifies the building, wherein the piece of equipment identifier identifies the piece of equipment, wherein the sensor identifier identifies the sensor; populating, the via the server, in real-time, the user profile with the readings such that the readings are associated with the building identifier, the piece of equipment identifier, and the sensor identifier in the user profile, wherein the sensor is associated with the readings in a one-to-many correspondence; identifying, via the server, in real-time, a present fault or a projected fault in the piece of equipment based on the readings sourced from the user profile; populating, via the server, in real-time, the user profile with the present fault or the projected fault such that the piece of equipment identifier is associated with the present fault or the projected fault in the user profile, wherein the piece of equipment identifier is associated with the present fault or the projected fault in a one-to-many correspondence; generating, via the server, in real-time, a message, wherein the message is informative of the present fault or the projected fault, wherein the message is informative of a position of the piece of equipment based on the building identifier and the piece of equipment identifier; sending, via the server, in real-time, the message to a mobile client accessing the user profile; generating, via the server, an AR content related to the present fault or the projected fault responsive to a request received from the mobile client as the mobile client is positioned in proximity of the position, wherein the AR content is generated based on the piece of equipment identifier, wherein the request is based on the message; and sending, via the server, the AR content to the mobile client responsive to the request.

DESCRIPTION OF DRAWINGS

FIG. 4 shows a screenshot of an embodiment of a user interface presenting an analytics menu and a photo of a piece of equipment at issue with a plurality of fault icons superimposed over the photo according to this disclosure.

FIG. 8 shows an embodiment of a sensor according to this disclosure.

DETAILED DESCRIPTION

Figure 1:
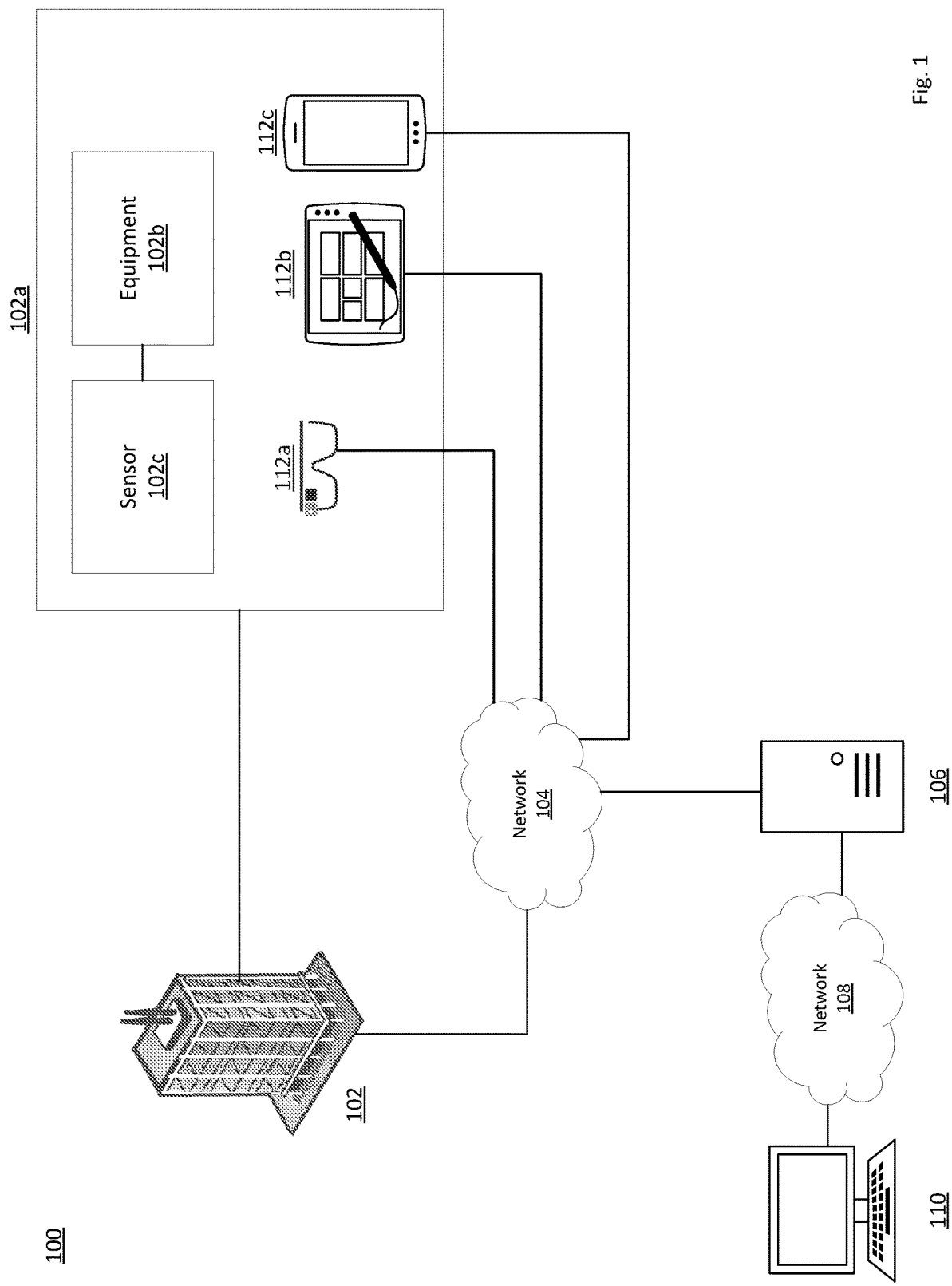
FIG. 1 shows a schematic diagram of an embodiment of a system for using a fault related AR content according to this disclosure.

FIG. 1 shows a schematic diagram of an embodiment of a system for using a fault related AR content according to this disclosure. In particular, a system 100 includes a building 102, a network 104, a server 106, a network 108, and a client 110. Further, the building 102 includes a defined area 102a containing a piece of equipment 102b, a sensor 102c, and a mobile device including an eyewear unit 112a, a tablet 112b, a smartphone 112c, a laptop, or a wearable. Note that this disclosure is not limited to buildings and can be used with other structures (e.g. marine vehicle, cruise ship, aircraft carrier, submarine, battleship, destroyer, frigate, barge, tanker, cargo ship, yacht, oil rig, train or car bridge, train or car tunnel, aerial vehicle, rocket, space station, airplane, helicopter, land vehicle, locomotive, bus, truck, railcar, subway car, automobile, roller coaster, natural resource mine, cell tower, street light, power grid, transmission tower, utility pole, collection of structures, fluid (e.g. liquid, gas, crude, petroleum, fuels, oil, natural gas, gasoline, hydrogen, ammonia, biofuel, sewage, slurry, non-alcoholic or alcoholic beverage, irrigation, steam, district heating, or other substances, whether chemically stable or unstable, whether lightly or heavily pressurized) conduction network, electrical energy conduction network, communications networks, land or rail traffic infrastructure item, pipeline network).

The building 102 (e.g. multistory, warehouse, skyscraper) is connected (e.g. wired, wireless) to the network 104 (e.g. local area, wide area). The building 102 can have a dedicated network connection (e.g. trunk, fiber optic bundle) to the network 104. The server 106 (e.g. physical, virtual, web, application, database, cloud) is connected (e.g. wired, wireless) to the network 104. The server 106 is connected (e.g. wired, wireless) to the network 108 (e.g. local area, wide area). The client 110 (e.g. desktop, laptop, tablet, smartphone, wearable) is connected (e.g. wired, wireless) to the network 108. The network 108 is communicatively positioned between the client 110 and the server 106. The client 110 can access the server 106 through the network 108. The server 106 is communicatively positioned between the network 108 and the network 104.

The building 102 can be of any type and for any purpose (e.g. residential, commercial, office, hospitality, medical, land/marine/aerial transportation, campus, data center, educational, law enforcement, government, military, logistical, warehouse, power plant, sewage plant, telecommunication hub, stadium, entertainment, arena, mall). The building 102 hosts the defined area 102a (e.g. mechanical room, electrical room, utility room, furnace room, mechanical floor, vehicular garage, basement area, elevator shaft), whether indoors or outdoors, whether aboveground or belowground. The piece of equipment 102b (e.g. air handlers, boilers, chillers, heat exchangers, heat pumps, water heaters, water tanks, water pumps, main distribution piping and valves, sprinkler distribution piping and pumps, back-up electrical generators, elevator machinery, motors, actuators, intermediate heaters, intermediate tanks, intermediate pumps, chiller plants, laundry machines, auxiliary equipment, telecommunications equipment, radiators, fans, compressors, refrigeration equipment, expansion valves, fluid filtration equipment, electric switchboards, distribution boards, circuit breakers and disconnects, electricity meters, transformers, busbars, backup batteries in battery rooms, fire alarm control panels, distribution frames, indoor electrical substation) is positioned within the defined area 102a. The piece of equipment 102b is stationary within the building 102 or the defined area 102a. The piece of equipment 102b can be affixed (e.g. fastened, mated, interlocked) to the building 102 or to the defined area 102a. The piece of equipment 102b can communicate with the server 106 over the network 104 including over the dedicated network connection of the building 102.

The sensor 102c can be active or passive, whether mechanical or electronic. The sensor 102c is configured to detect or to respond to an input from a physical environment. The input can be light, heat, motion, moisture, humidity, sound, electricity, pressure, or any other environmental aspect/parameter/condition. The sensor 102c can provide an output, such as a signal, which is sent, whether in a wired manner or a wireless manner, to the server 106. Whether additionally or alternatively, the sensor 102c can comprise or be coupled (e.g. electrically, mechanically) to a transducer. The sensor 102c can be powered via a power source, whether in a wired manner or a wireless manner, such as a battery, a renewable energy source, such as a wind turbine or a water turbine, or a photovoltaic cell. The sensor 102c can be powered via a mains power line. The sensor 102c can be acoustic, sound, or vibration based (e.g. geophone, hydrophone, microphone). The sensor 102c can be a chemical sensor (e.g. oxygen sensor, carbon dioxide sensor, carbon monoxide sensor, hydrogen sensor, catalytic bead sensor, chemical field-effect transistor, electrochemical gas sensor, electronic nose, electrolyte insulator semiconductor sensor, fluorescent chloride sensor, holographic sensor, hydrocarbon dew point sensor, hydrogen sulfide sensor, infrared point sensor, non-dispersive infrared sensor, microwave chemistry sensor, nitrogen oxide sensor, olfactometer, optode, ozone monitor, pellistor, glass electrode, potentiometric sensor, smoke detector, zinc oxide nanorod sensor). The sensor 102c can be electric current, electric potential, magnetic, or radio based (e.g. current sensor, Daly detector, electroscope, galvanometer, hall effect sensor, magnetic anomaly detector, magnetometer, micro-electromechanical (MEMS) magnetic field sensor, metal detector, radio direction finder, a voltage detector). The sensor 102c can be flow or fluid velocity based (e.g. air flow meter, anemometer, flow sensor, gas meter, mass flow sensor, water meter). The sensor 102c can be a radiation sensor (e.g. Geiger counter). The sensor 102c can be an altimeter or a depth gauge. The sensor 102c can be position, angle, displacement, distance, speed, or acceleration based (e.g. capacitive sensor, photoelectric sensor, shock or impact sensor, tilt sensor, ultrasonic thickness sensor). The sensor 102c can be optical, light, imaging, or photon based (e.g. electro-optical sensor, flame detector, infrared sensor, photo detector, photoionization detector, photo switch, phototube, scintillometer). The sensor 102c can be pressure based (e.g. barograph, barometer, fluid density sensor, piezometer, fluid pressure sensor, tactile sensor, contact sensor). The sensor 102c can be force, density, or level based (e.g. hydrometer, force gauge, level sensor, load cell, magnetic level gauge, nuclear density gauge, piezoelectric sensor, strain gauge, viscometer). The sensor 102c can be thermal, heat, or temperature based (e.g. bolometer, bimetallic strip, calorimeter, Gardon gauge/circular-foil gauge, Golay cell, heat flux sensor, infrared thermometer, quartz thermometer, resistance thermometer, silicon bandgap temperature sensor, thermometer, thermistor, thermocouple, pyrometer). The sensor 102c can be proximity or presence based (e.g. alarm sensor, motion detector, occupancy sensor, proximity sensor, passive infrared sensor, reed switch, glass or material integrity break sensor). The sensor 102c can be at least one of a mold sensor, a mildew sensor, or a sensor configured to sense an environmental condition favorable to at least one of a mold, a mildew, or a fungus, such as disclosed in U.S. Pat. No. 7,382,269, which is fully incorporated by reference herein for all purposes. Note that any sensor disclosed herein is an example and any other type of material property or physical environment sensor can be used, whether additionally or alternatively.

The sensor 102c is in communication (e.g. wired, wireless) with the server 106 over the network 104 including the dedicated network connection of the building 102. The sensor 102c is coupled (e.g. electrically, fluidly, signally, mechanically, acoustically, optically) to the piece of equipment 102b. The sensor 102c can be in electrical or fluid communication with the piece of equipment 102b. As such, the sensor 102c monitors (e.g. periodically, continuously) operation of the piece of equipment 102b and can communicate (e.g. push, stream, email, text, message) with the server 106 over the network 104 including over the dedicated network connection of the building 102. Therefore, the sensor 102c can send a plurality of sensed readings, in real-time, to the server 106 over the network 104.

Note that this monitoring can be performed in various ways (e.g. electrical, fluid, thermal, optical, acoustic, vibration, mechanical). The sensor 102c can monitor an electric property (e.g. current, voltage, amperage) of the piece of equipment 102b. The sensor 102c can monitor a fluid property (e.g. pressure, volume, temperature) of the piece of equipment 102b. The sensor 102c can monitor a heat property (e.g. temperature) of the piece of equipment 102b. The sensor 102c can monitor an acoustic property (e.g. sound, type of sound, pitch) of the piece of equipment 102b. The sensor 102c can monitor a vibrational property (e.g. frequency, direction) of the piece of equipment 102b. The sensor 102c can monitor an optical property (e.g. change in shape, change in volume, movement of the piece of equipment. The sensor 102c can monitor an ambient condition (e.g. air, pressure, light, sound, wind, temperature) of a position of the piece of equipment 102b. The sensor 102c can monitor an air property (e.g. temperature, humidity, pressure) of a position of the piece of equipment 102b.

The sensor 102c can be or can avoid being attached (e.g. fastened, mated, interlocked, adhered, hook-and-looped, nailed, stapled) to the building 102 or the defined area 102a. The sensor 102c can be or can avoid being physically attached (e.g. fastened, mated, interlocked, adhered, hook-and-looped, nailed, stapled) to the piece of equipment 102b or be a component thereof. When the piece of equipment 102b inputs or outputs an electrical energy (e.g. current) via a wire, then the sensor 102c can monitor the electrical energy or the wire. When piece of equipment 102b inputs or outputs a fluid (e.g. liquid, gas) via a tube, then the sensor 102c monitors the fluid or the tube.

In one mode of operation, the server 106 creates a user profile (e.g. data structure, database record, array, tree) based on an input (e.g. browser, dedicated application, mobile app) from the client 110 over the network 108. The server 106 populates (e.g. writes) the user profile with a building identifier (e.g. alphanumeric string, barcode), a piece of equipment identifier (e.g. alphanumeric string, barcode), and a sensor identifier (e.g. alphanumeric string, barcode) such that the building identifier is logically associated with the piece of equipment identifier in a one-to-many correspondence in the server 106 and the building identifier is logically associated with the sensor identifier in a one-to-many correspondence in the server 106. The server 106 receives, in real-time, a plurality of sensed readings from the sensor 102c monitoring the piece of equipment 102b in real-time. The sensor 102c and the piece of equipment 102b are positioned within the defined area 102a of the building 102. The sensor 102c and the piece of equipment 102b are stationary within the building 102. The building identifier identifies the building 102 within the server 106. The piece of equipment identifier identifies the piece of equipment within the server 106. The sensor identifier identifies the sensor within the server 106. The server 106 populates (e.g. writes), in real-time, the user profile with the sensed readings such that the sensed readings are logically associated with the building identifier, the piece of equipment identifier, and the sensor identifier in the user profile. The sensor 102c is logically associated with the sensed readings in a one-to-many correspondence in the server 106. The server 106 identifies, in real-time, a present fault (e.g. presently broken or malfunctioning component) or a projected fault (e.g. component projected to break or malfunction in future) in the piece of equipment 102b based on the sensed readings sourced (e.g. read, collected) from the user profile. The server 106 populates (e.g. writes), in real-time, the user profile with the present fault or the projected fault such that the piece of equipment identifier is logically associated with the present fault or the projected fault in the user profile. The piece of equipment identifier is logically associated with the present fault or the projected fault in a one-to-many correspondence in the server 106. The server 106 generates, in real-time, a message (e.g. alphanumerics, graphics, video, analytics) informative of the present fault or the projected fault. The message is also informative of a position (e.g. outdoor location or coordinates, indoor location or coordinates) of the piece of equipment 102b within the building 102 or the defined area 102a based on the building identifier and the piece of equipment identifier. The server 106 sends, in real-time, the message to a mobile client (e.g. eyewear unit 112a, tablet 112b, a smartphone 112c) accessing the user profile (e.g. browser, mobile app, dedicated application). The server 106 generates an AR content (e.g. graphics, audio, images, video, text, haptics, vibration) related to the present fault or the projected fault responsive to a request (e.g. user interface button, camera pointing at the piece of equipment 102b) received from the mobile client as the mobile client is positioned in proximity (e.g. within about 10, 9, 8, 7, 6, 5, 4, 3, 2, 1 meters) of the position. The AR content can include a repair content related to the present fault or the projected fault or a maintenance content related to the present fault or the projected fault. The AR content is generated based on the piece of equipment identifier. The request is based on the message (e.g. activating button or hyperlink within the message). The server 106 sends the AR content to the mobile client responsive to the request. The mobile client can receive the AR content over the dedicated network connection. The mobile client can be operated by an operations and maintenance (O&M) staff member. The AR content can be triggered by any sensor, as described herein, a marker (e.g. barcode, quick response (QR) code), a Bluetooth low energy beacon (e.g. iBeacon, AltBeacon, URIBeacon, Eddystone), or an radio frequency identification (RFID) chip.

Note that before, during, or after the AR content is sent from the server 106 to the mobile client, the server 106 can allow the client 110 to access (e.g. read, write, modify, delete) the readings from the sensor 102c, communicate (e.g. command, retrieve data) with the piece of equipment 102b or the sensor 102c, and access (e.g. read, write, modify, delete) some, most, or all data (e.g. text, graphics, AR, analytics, notifications) that is available to the mobile client. The client 110 can communicate with the piece of equipment 102b, the sensor 102c, or the mobile client over the dedicated network connection of the building 102. The client 110 can also communicate with the mobile client, while the AR content is presented on the mobile client, in order to assist in repair or maintenance (e.g. phone call, teleconference, video call, chat, text, email, social network, over-the-top (OTT) message). The client 110 may have lower, equal, or higher computing access privileges or rights to the server 106 than the mobile client.

Figure 2:
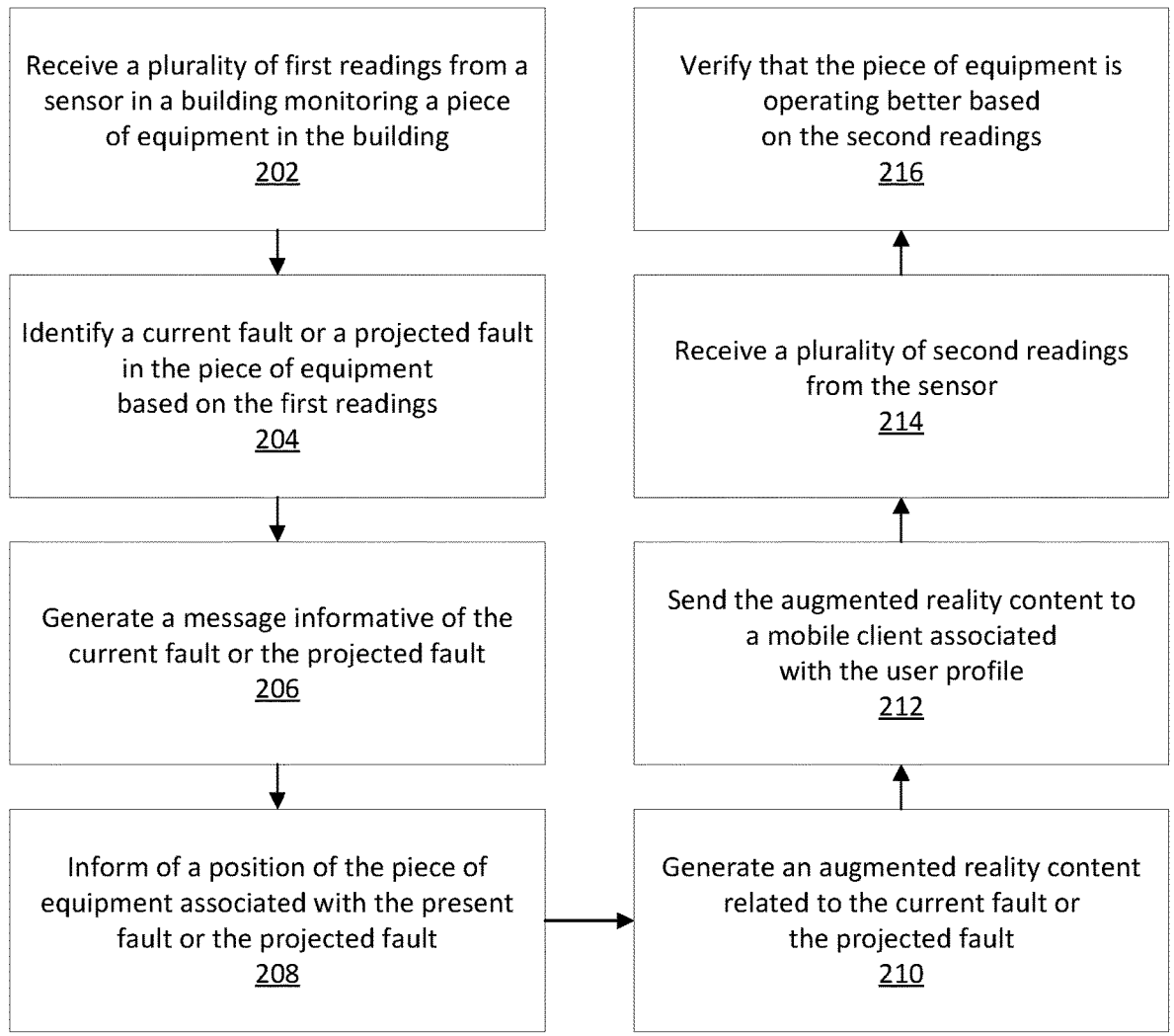
FIG. 2 shows a flowchart of an embodiment of a method of employing a fault related AR content according to this disclosure.

FIG. 2 shows a flowchart of an embodiment of a method of employing a fault related AR content according to this disclosure. In particular, a method 200 is performed using the system 100.

In block 202, the server 106 receives, in real-time, a plurality of first readings from the sensor 102c in the building 102, where the sensor 102c monitors the piece of equipment 102b in real-time and where the piece of equipment 102 is stationary within the building. Note that the server 106 creates a user profile (e.g. data structure, database record, array, tree) based on an input (e.g. browser, dedicated application, mobile app) from the client 110 over the network 108. The server 106 can store the user profile in a database (e.g. relation, in-memory, NoSQL). The server 106 populates (e.g. writes) the user profile with a building identifier (e.g. alphanumeric string, barcode), a piece of equipment identifier (e.g. alphanumeric string, barcode), and a sensor identifier (e.g. alphanumeric string, barcode) such that the building identifier is logically associated with the piece of equipment identifier in a one-to-many correspondence in the server 106 and the building identifier is logically associated with the sensor identifier in a one-to-many correspondence in the server 106. The sensor 102c and the piece of equipment 102b are positioned within the defined area 102a of the building 102. The sensor 102c and the piece of equipment 102b are stationary within the building 102. The building identifier identifies the building 102 within the server 106. The piece of equipment identifier identifies the piece of equipment within the server 106. The sensor identifier identifies the sensor within the server 106. The server 106 populates (e.g. writes), in real-time, the user profile with the sensed readings such that the first readings are logically associated with the building identifier, the piece of equipment identifier, and the sensor identifier in the user profile. The sensor 102c is logically associated with the first readings in a one-to-many correspondence in the server 106. The piece of equipment identifier can be logically associated with the sensor identifier in a one-to-one correspondence. The piece of equipment identifier can be associated with the sensor identifier in a one-to-many correspondence.

In block 204, the server 106 identifies, in real-time, a current fault (e.g. presently broken or malfunctioning component) or a projected fault (e.g. component projected to break or malfunction in future) in the piece of equipment 102b based on the first readings sourced (e.g. read, collected) from the user profile. The server 106 populates (e.g. writes), in real-time, the user profile with the present fault or the projected fault such that the piece of equipment identifier is logically associated with the present fault or the projected fault in the user profile. The piece of equipment identifier is logically associated with the present fault or the projected fault in a one-to-many correspondence in the server 106.

In block 206, the server 106 generates, in real-time, a message (e.g. alphanumerics, graphics, video, analytics) informative of the current fault or the projected fault in the piece of equipment 102b. The server 106 sends, in real-time, the message to a mobile client (e.g. eyewear unit 112a, tablet 112b, a smartphone 112c) accessing the user profile (e.g. browser, mobile app, dedicated application).

In block 208, the server 106 informs, in real-time, of a position (e.g. outdoor location or coordinates, indoor location or coordinates) of the piece of equipment 102b associated with the present fault or the projected fault. The position can be contained in the message noted above or be output in another message, prompt, or menu. The position of the piece of equipment 102b can be within the building 102 or the defined area 102a based on the building identifier and the piece of equipment identifier. The server 106 sends, in real-time, the position to the mobile client (e.g. eyewear unit 112a, tablet 112b, a smartphone 112c) accessing the user profile (e.g. browser, mobile app, dedicated application).

In block 210, the server 106 generates, in real-time, an AR content (e.g. graphics, audio, images, video, text, haptics, vibration) related to the current fault or the projected fault. The server 106 generates the AR content responsive to a request (e.g. user interface button, camera pointing at the piece of equipment 102b) received from the mobile client as the mobile client is positioned in proximity (e.g. within about 10, 9, 8, 7, 6, 5, 4, 3, 2, 1 meters) of the position. The AR content is generated based on the piece of equipment identifier. Note that the AR content can be generated based on the server 106 deciding or knowing that the AR content relates to a single handed maintenance operation (e.g. eyewear unit 112a) or a dual handed maintenance operation (e.g. tablet 112b, smartphone 112c). The request is based on the message (e.g. activating button or hyperlink within the message).

In block 212, the server 106 sends the AR content to the mobile client. The server 106 sends the AR content to the mobile client responsive to the request. The mobile client can receive the AR content over the dedicated network connection.

In block 214, the server 106 receives, in real-time, a plurality of second readings from the sensor 103c after the AR content is presented on the mobile client or after the mobile client informs (e.g. push, stream, email, text, message) the server 106 that the present fault or the projected fault have been corrected in the piece of equipment 102b. This information can be via a user input (e.g. physical keyboard, virtual keyboard, icon) into the mobile client. The mobile client can communicate (e.g. wired, wireless) with the server 106 over the network 104 including the dedicated network connection of the building 102.

In block 216, the server 106 verifies (e.g. compares operational data, analytics), in real-time, that the piece of equipment is operating better based on the second readings relative to the first readings. The server 106 can determine, in real-time, whether the piece of equipment is operating better based on the second readings relative to the first readings and take an action based on the piece of equipment operating better based on the second readings relative to the first readings or take an action based on the piece of equipment not operating better based on the second readings relative to the first readings. The action can include modifying the user profile, presenting a success message, presenting a failure message, or starting a repair or maintenance wizard to further focus on the present fault or the projected fault.

Figure 3:
FIG. 3 shows a screenshot of an embodiment of a user interface presenting a notification menu, a photo of a piece of equipment at issue with a plurality of fault icons superimposed over the photo, and a floor map locating the piece of equipment and superimposed over the photo according to this disclosure.

FIG. 3 shows a screenshot of an embodiment of a user interface presenting a notification menu, a photo of a piece of equipment at issue with a plurality of fault icons superimposed over the photo, and a floor map locating the piece of equipment and superimposed over the photo according to this disclosure. In particular, a user interface 300 is presented on a mobile client (e.g. eyewear unit 112a, tablet 112b, smartphone 112c) when the mobile client is informed of the present fault or the projected fault or when the mobile client is in proximity (e.g. within about 10, 9, 8, 7, 6, 5, 4, 3, 2, 1 meters) of the piece of equipment 102b or imaging the piece of equipment 102b.

The user interface 300 has a notification menu (e.g. why this notification issued), a photo of a piece of equipment at issue (e.g. the piece of equipment 102b) with a plurality of fault icons superimposed over the photo (e.g. AR content), and a floor map locating the piece of equipment (e.g. the piece of equipment 102b) and superimposed over the photo. The notification menu is open and other menus (e.g. analytics, additional information) underneath the notification menu are closed. However, note that variations are possible and other menus can be concurrently open.

The user interface 300 presents the floor map such that the building identifier is associated with the floor map in a one-to-many correspondence. Note that the user interface 300 can include the message sent from the server 106 to the mobile client and the message can contain the floor map or hyperlinks to the floor map. The floor map includes an equipment graphic (e.g. icon) associated with the piece of equipment identifier. The floor map can also include a client graphic (e.g. icon) associated with the mobile client and move the client graphic (e.g. toward or away from the equipment graphic) as the mobile client moves (e.g. satellite, terrestrial, outdoor, or indoor geolocation). Non-real time static documentation is shown inset on the right (a floor plan with equipment locations) that corresponds to the augmented reality view. Blue information alerts are overlaid on the faulted equipment, and the relevant real-time information is overlaid on the left side.

FIG. 4 shows a screenshot of an embodiment of a user interface presenting an analytics menu and a photo of a piece of equipment at issue with a plurality of fault icons superimposed over the photo according to this disclosure. In particular, a user interface 400 is presented on a mobile client (e.g. eyewear unit 112a, tablet 112b, smartphone 112c) when the mobile client is informed of the present fault or the projected fault or when the mobile client is in proximity (e.g. within about 10, 9, 8, 7, 6, 5, 4, 3, 2, 1 meters) of the piece of equipment 102b or imaging the piece of equipment 102b.

The user interface 400 is similar to the user interface 300 except for an analytics menu being open and other menus being closed. As explained above, other variations are possible and other menus, whether above or below, can be concurrently open. Note that the analytics menu presents information formed based on a plurality of readings received, in real-time, from the sensor 102c monitoring the piece of equipment 102b in real-time. The analytics menu is related to the notification menu and presents related content but in different format.

Derived real-time data (such as time series views) can be observed for the relevant equipment. Any O&M staff member can view the three types of data overlaid on the AR view of the machine room. At the present time, equipment may be monitored remotely. However, an on-site field technician or third party repair subcontractor will almost certainly NOT have access to real time data. Presently, the state of the art consists of a work order indicating a possible problem condition in a machine room. A technician usually has to spend hours 1) locating the room, 2) locating the specific failed equipment out of a room with multiple identical looking machines, 3) work out a method to access technical manuals and parts catalogs, 4) perform troubleshooting. Troubleshooting usually means touching, listening, smelling, and making observations. Unfortunately, electrical and mechanical equipment may not always exhibit symptoms recognizable to a technician. The problem could also be intermittent. Allowing an O&M person to view real-time and derived real time data is a diagnostic capability that does not currently exist. The analytics can also use cumulative run-time or trend analysis to direct preventive maintenance well ahead of failures as well. The innovation allows junior technicians to operate with the proficiency of an expert technician.

Figure 5:
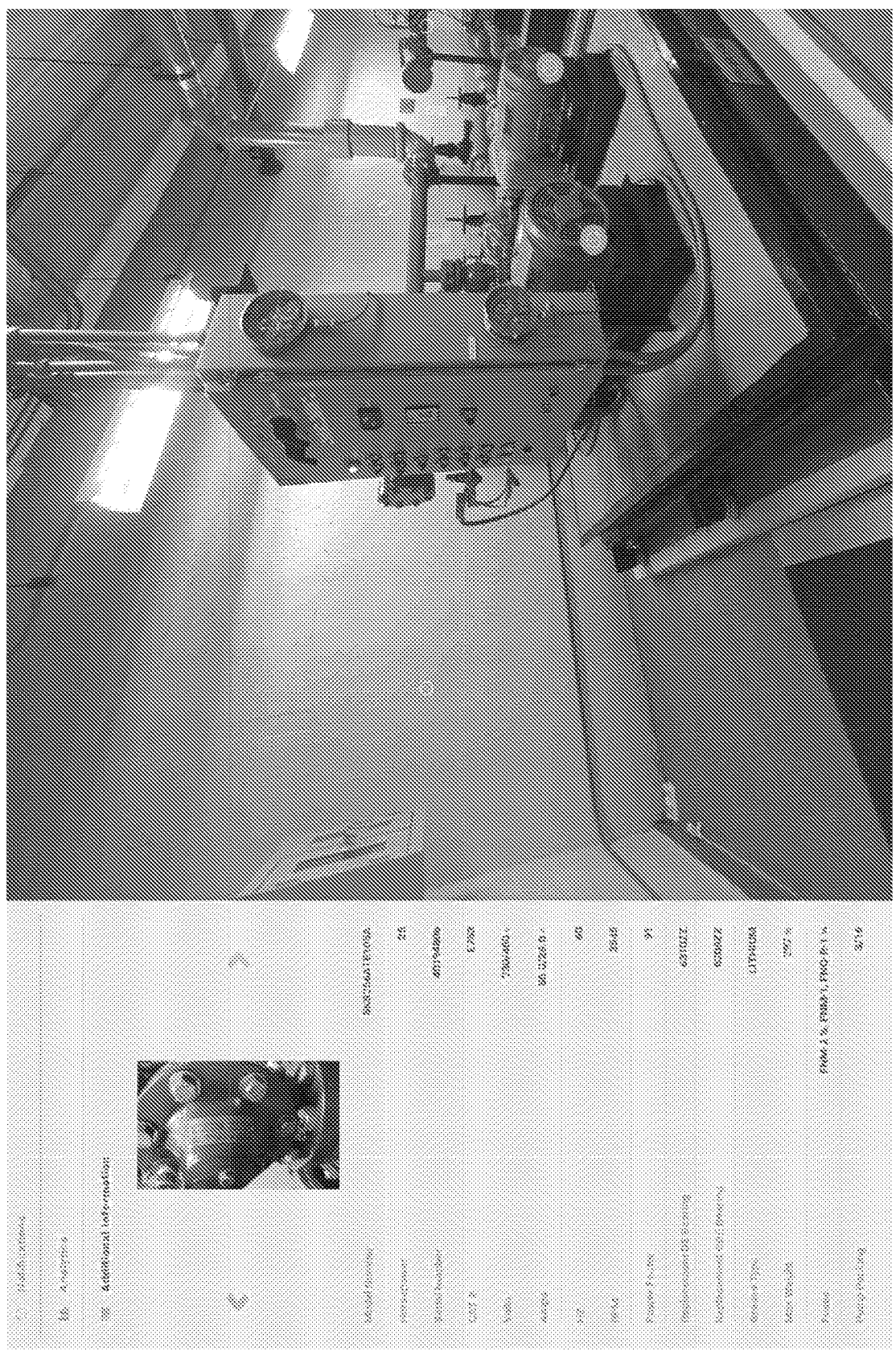
FIG. 5 shows a screenshot of an embodiment of a user interface presenting an additional information menu and a photo of a piece of equipment at issue with a plurality of fault icons superimposed over the photo according to this disclosure.

FIG. 5 shows a screenshot of an embodiment of a user interface presenting an additional information menu and a photo of a piece of equipment at issue with a plurality of fault icons superimposed over the photo according to this disclosure. In particular, a user interface 500 is presented on a mobile client (e.g. eyewear unit 112a, tablet 112b, smartphone 112c) when the mobile client is informed of the present fault or the projected fault or when the mobile client is in proximity (e.g. within about 10, 9, 8, 7, 6, 5, 4, 3, 2, 1 meters) of the piece of equipment 102b or imaging the piece of equipment 102b.

The user interface 500 is similar to the user interface 300 and 400 except for an additional information menu being open and other menus being closed. As explained above, other variations are possible and other menus, whether above or below, can be concurrently open. The additional information menu presents information formed based on a plurality of readings received, in real-time, from the sensor 102c monitoring the piece of equipment 102b in real-time. The additional information menu is related to the notification menu and the analytics menu and presents related content but in different format from the notification menu and the analytics menu. Non-field experts can also be called upon to review and observe information within the machine room to further direct a technician. Detailed specifications and equipment verification details are integrated together.

Figure 6:
FIG. 6 shows a screenshot of an embodiment of a user interface presenting an AR content related to a piece of equipment shown in the user interface where the AR content includes a present fault icon and a projected fault icon being visually distinct from each other according to this disclosure.

FIG. 6 shows a screenshot of an embodiment of a user interface presenting an AR content related to a piece of equipment shown in the user interface where the AR content includes a present fault icon and a projected fault icon being visually distinct from each other according to this disclosure. In particular, a user interface 300 is presented on a mobile client (e.g. eyewear unit 112a, tablet 112b, smartphone 112c) when the mobile client is informed of the present fault or the projected fault and when the mobile client is in proximity (e.g. within about 10, 9, 8, 7, 6, 5, 4, 3, 2, 1 meters) of the piece of equipment 102db and imaging the piece of equipment 102b. The user interface 600 contains an AR content that (e.g. red icon) and a second graphic (blue icon), where the first graphic is visually distinct from the second graphic (e.g. color) and the first graphic is associated with the present fault and the second graphic is associated with the projected fault.

Faults and predictive faults are indicated directly on top of the related equipment, and are differentiated from non-fault data (see red and blue icons as an example method for doing it. There can be other means to highlight the conditions). The O&M personnel can drill in and access a complete view of the three types of data.

Figure 7:
FIG. 7 shows a list of some devices that can be employed according to this disclosure.
Figure 9:
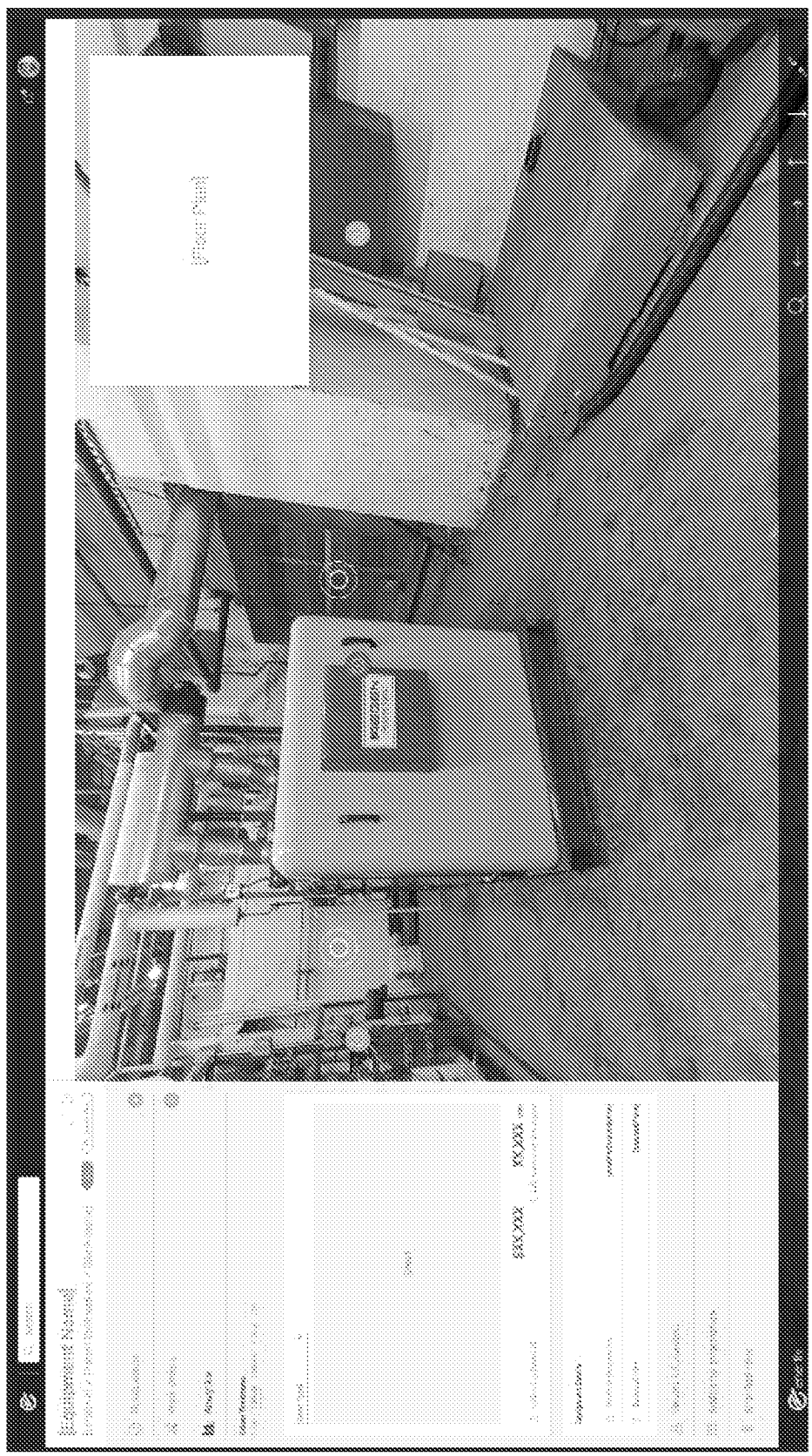
FIGS. 9-17 show various embodiments of user interfaces according to this disclosure.
Figure 10:
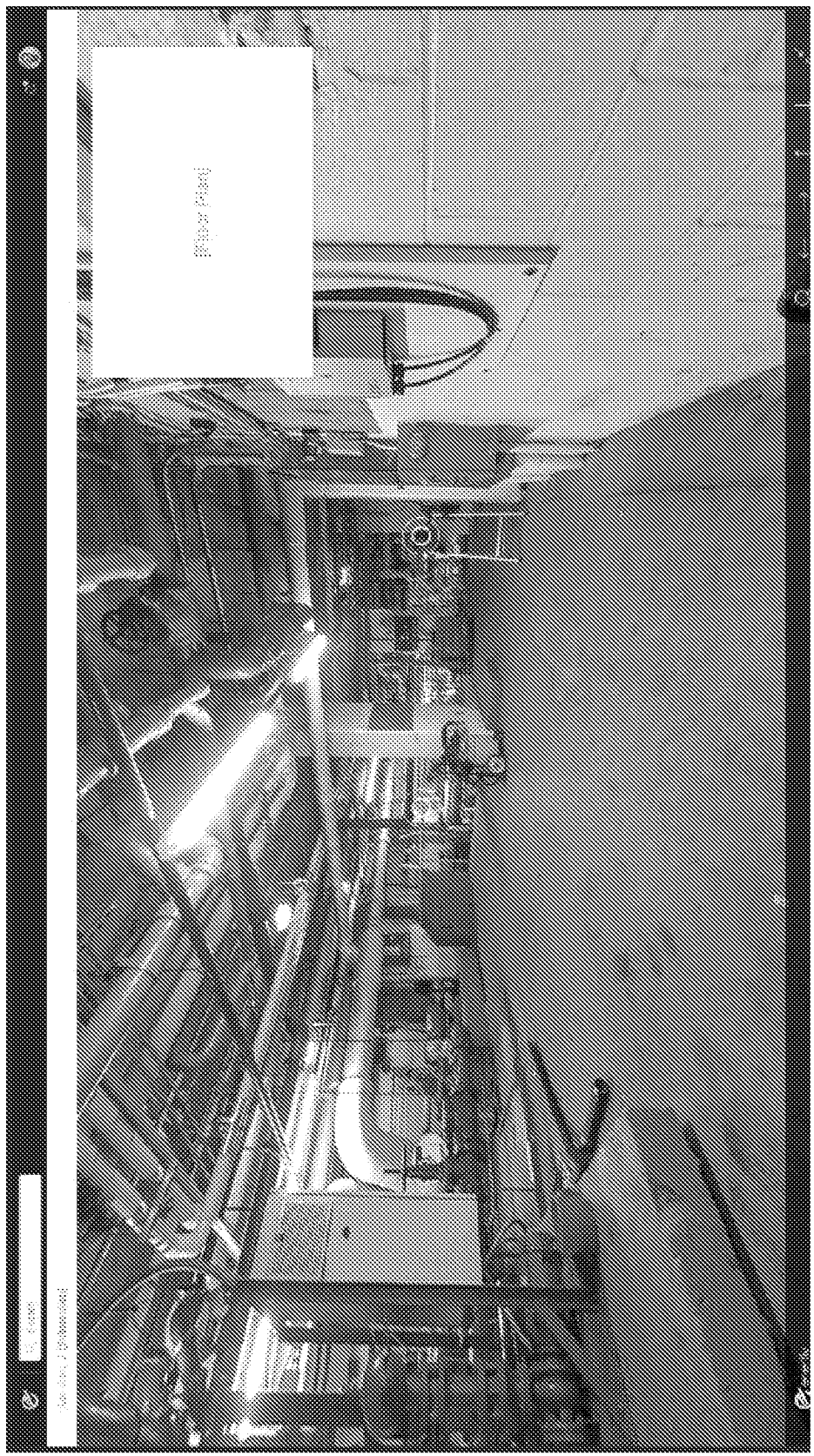
Figure 11:
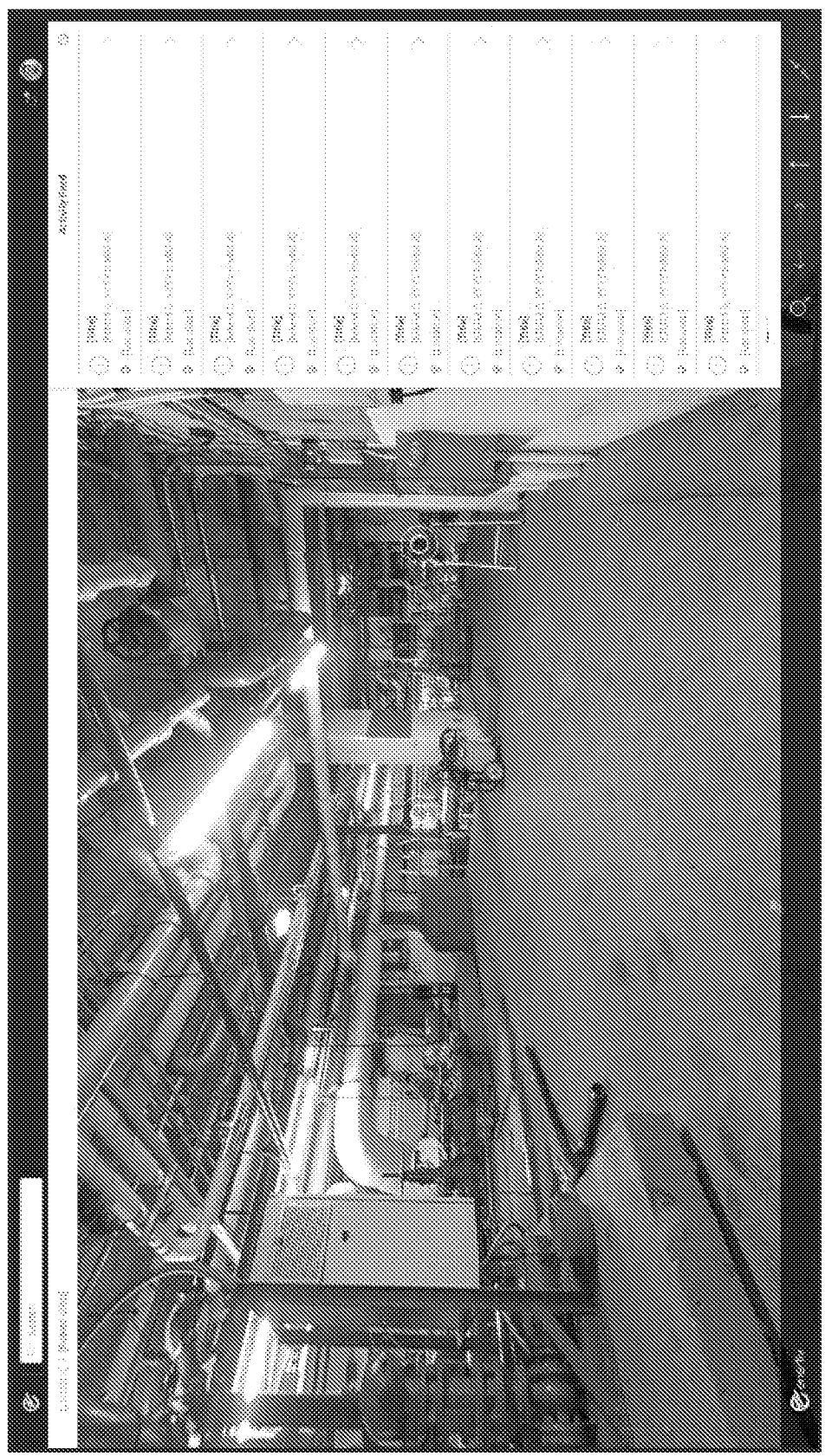
Figure 12:
Figure 13:
Figure 14:
Figure 15:
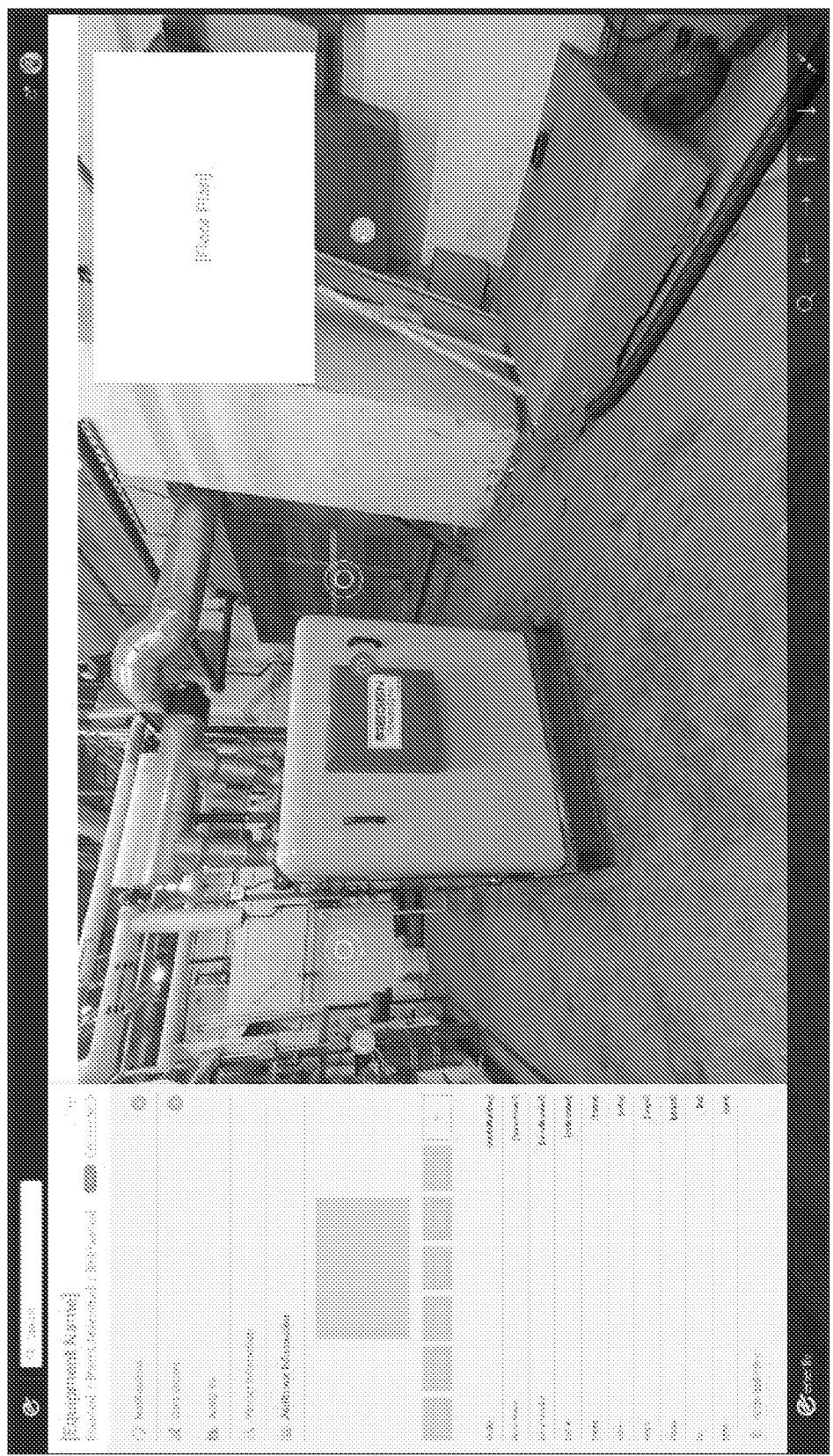
Figure 16:
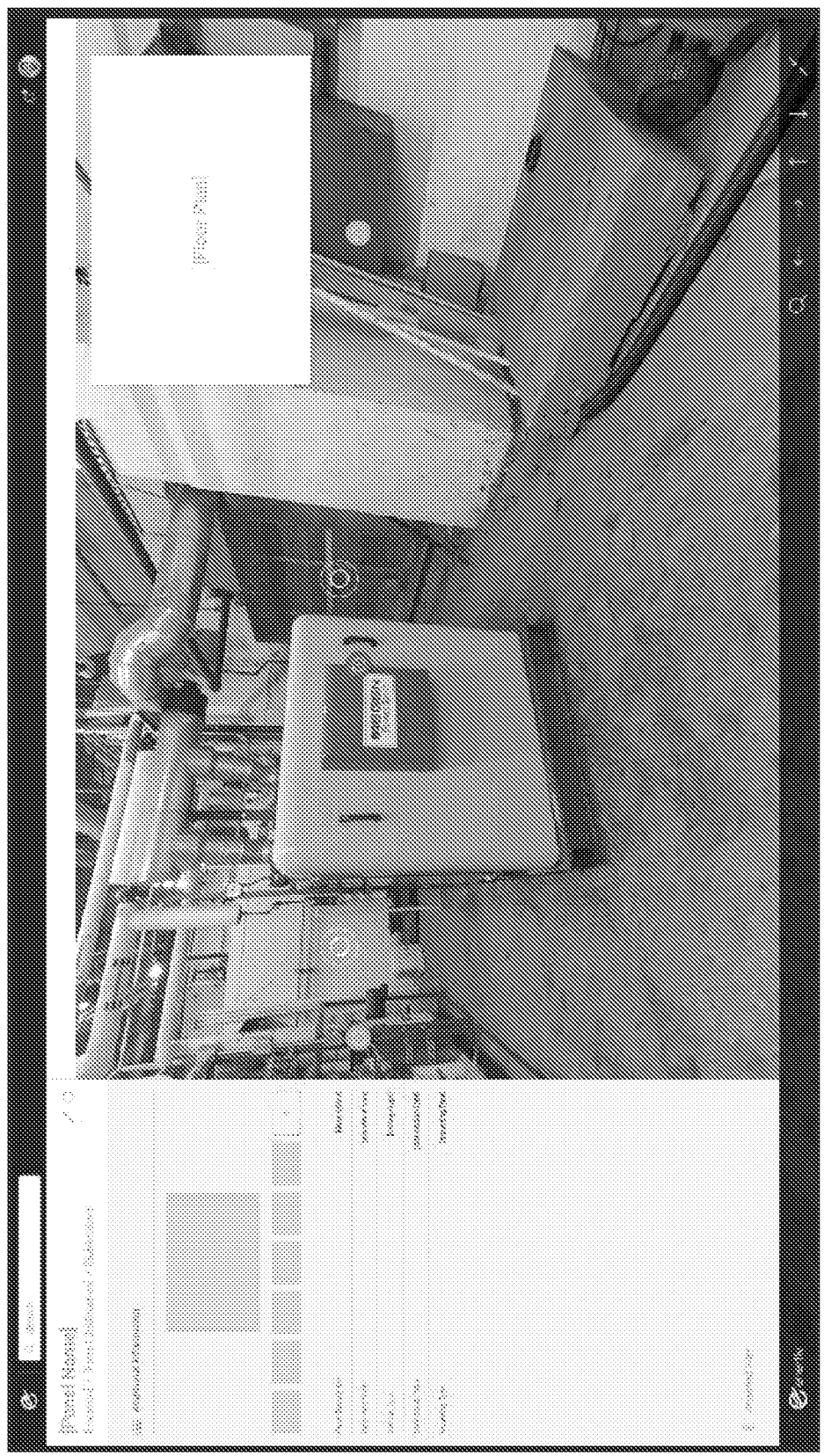
Figure 17:
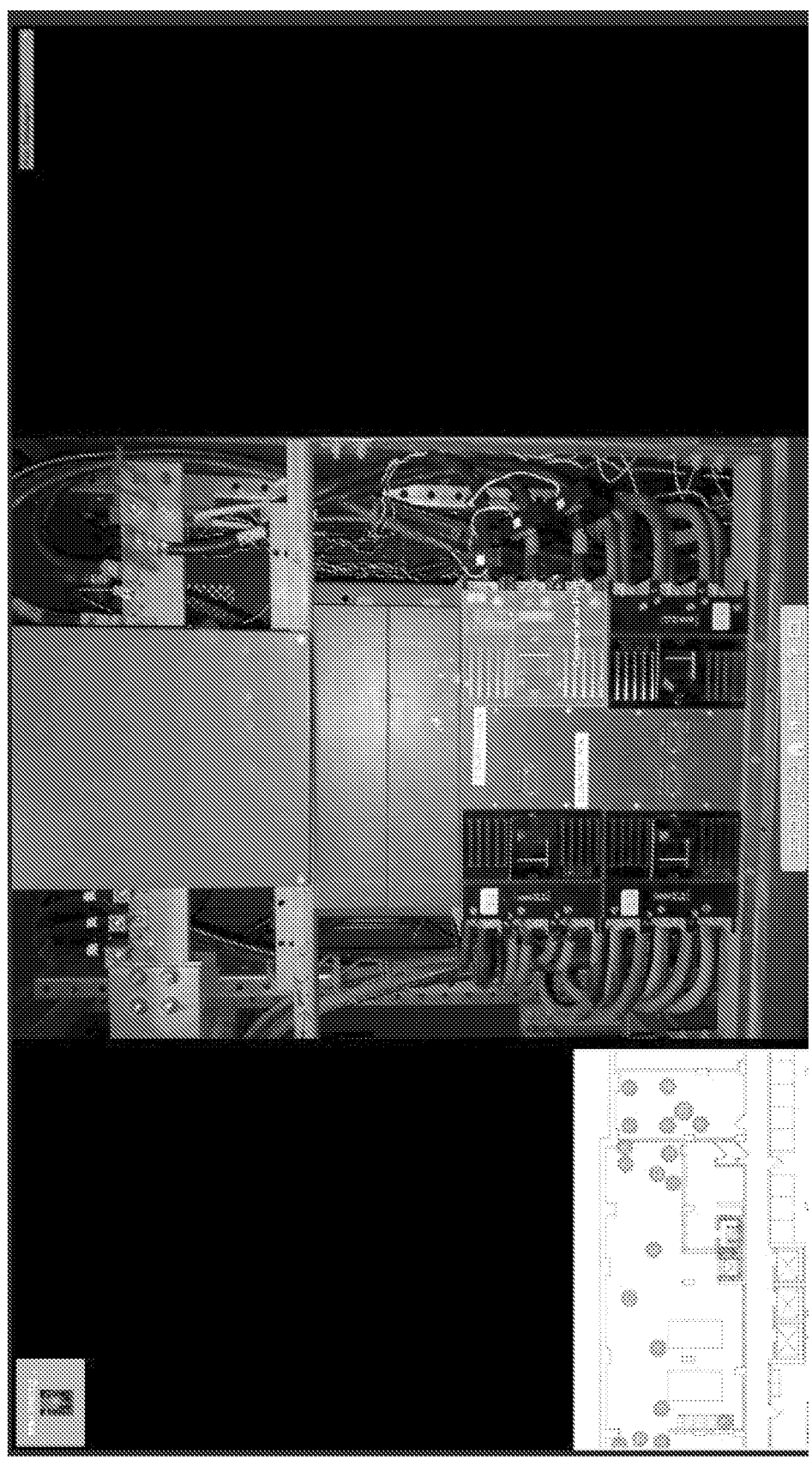

FIG. 7 shows a list of some devices that can be employed according to this disclosure. The piece of equipment 102b can include any member of a list of critical equipment. The sensor 102c can include any member of a list of Internet-of-Things (IOT) sensors. The server 106 can receive data from any member of a list of existing sources. This data can be combined with a plurality of readings from the sensor 102c to aid in identifying the present fault or the projected fault in the piece of equipment 102b.

FIG. 8 shows an embodiment of a sensor according to this disclosure. In particular, a sensor 800 includes a branch circuit meter 802 that is designed to monitor electricity consumption for a plurality of input channels (e.g. less than or more than 20, 30, 40, 50). The inputs are sufficient to collect data from a fully populated standard commercial electrical panel. Data is collected through a use of split core current transformers (CT) and voltage taps (VT). Its branch circuit monitor and data acquisition system can be confined within an IP66 National Electrical Manufacturers Association (NEMA) 4× rated enclosure. The branch circuit meter 802 can be electrically coupled to an electrical panel by mounting the branch circuit meter 802 near (within about 10, 9, 8, 7, 6, 5, 4, 3, 2, 1 meters) the electrical panel. The electrical panel is then opened and CTs are clipped around each individual breaker and the VTs are connected to each phase. The wires are bundled and passed through metal conduit which connects the branch circuit meter 802 with the breaker panel. Data transmitted by each CT is stored locally on the data acquisition system. The data is securely (e.g. HTTPS) pushed to the server 106 periodically (e.g. every minute for real-time display to the client 110). The branch circuit meter 802 can use the dedicated network connection of the building 102 or a cellular connection.

As explained above, in some embodiments, this disclosure improves at least some efficiency and effectiveness of commercial real estate building O&M. This disclosure enables can be used by O&M staff and can include: 1) real-time equipment performance data, 2) actionable maintenance and fault detection insights, and 3) an AR overlay with relevant O&M responses. This disclosure can improve operational efficiency for commercial building O&M staff by representing real-time equipment health and predicted equipment failures on an AR application. This disclosure provides accurate, available, location-relevant, real-time and actionable data reflecting real world conditions and universal equipment support. This disclosure can enable comparing a current performance baseline to O&M practices using sensors to capture live equipment data in a manner universal to any equipment type or protocol, machine learning (ML) to derive machine health and anticipate equipment faults with application of augmented reality. This disclosure can reduce time spent locating equipment, troubleshooting issues and verifying resolutions, as well as reducing a number of planned to unplanned maintenance activities and a number of equipment malfunctions.

As explained above, in some embodiments, this disclosure includes significant economic, environmental and quality of life improvements for those who own and occupy commercial real estate. O&M is a costly phase of a building's life cycle such that even small innovations yield major results. Some studies show that 98% of maintenance tickets are for correcting problems rather than preventative maintenance. In one O&M AR study, researchers found task time savings of 51% when O&M staff can see equipment locations and equipment originated real-time data from BACnet compatible assets. Despite a tantalizing result, the researchers did not progress this innovation to add universal compatibility beyond their limited BACnet based prototype. Other AR efforts in a building field have been limited to architectural design, repair/task training, and occasionally, U/X worker efficiency studies for various AR interface types. Using ML and AR to optimize maintenance yields three areas of value: 1) improving the efficiency of maintenance staff as determined by time spent identifying and resolving equipment faults, 2) improving the ratio between planned and unplanned maintenance and 3) reducing the number of "critical events" for building systems. This can result in fewer equipment replacements, improved tenant health, better economic outcomes for owners and operators, reduced carbon footprint, and more effective onboarding for new maintenance staff as older generation staff retires.

As explained above, in some embodiments, this disclosure is useful for owner/operators of commercial office and multifamily building portfolios. Their pain points are due to the high costs and tenant issues resulting from reactive versus preventative maintenance, limited transparency and accountability for staff, attrition of senior staff due to retirement and long onboarding periods for new staff, and decreasing O&M budgets. The owner/operators of large portfolios will make the purchasing decisions, but the user will be the O&M staff who spend their days in mechanical rooms across multiple buildings. In practice, O&M staff are stretched thin in many commercial real estate portfolios, which leads to deferred maintenance, the cost of which compounds at 7% a year and ultimately leads to more faults and emergencies. Additionally, inefficiencies from time spent navigating buildings to locate the equipment, performing troubleshooting in-situ without access to live or historical data, and having no data-driven method to ensure resolution of an issue drives up the cost of O&M activities. Current practices rely heavily on human senses such as sound, smell and touch to investigate failures, and while technology solutions exist for fault detection, diagnostics are often represented as uncontextualized numbers and/or directed to a building operations center where the information is unavailable to the technician in-situ.

As explained above, in some embodiments, O&M staff can improve the time spent determining the root cause of equipment faults, locating the related equipment, troubleshooting, and confirming resolutions, ultimately improving equipment performance and financial outcomes. In addition to a tool to improve the effectiveness and efficiency for staff, executives will, for the first time ever, get real-time visibility into how their portfolio is performing from an O&M perspective. As commercial building life cycle research has steadily improved parametric forecasting of O&M costs, the general conclusion remains that O&M and staffing constitute the majority of the total lifetime costs of owning and operating a building. Improvements to O&M have major economic benefits resulting from more efficient use of human capital, reduced equipment replacement fund requirements, and improved energy efficiency. The value to the customer is to 1) more quickly identify the location of equipment faults by correlating real-time fault and troubleshooting information onto augmented mechanical areas, 2) provide better root cause data for failures and faster resolutions, 3) shift from sense-based inference to data-driven maintenance practices, and 4) enable junior operators to perform near the competence of more experienced operators. The value to society is a healthier and more comfortable indoor environment, in which Americans spend 90% of their time, as well as a reduction in global climate change due to greenhouse gas emissions.

As explained above, in some embodiments, this disclosure improves at least some efficiency and effectiveness of O&M staff through the use of a human-computer interface (HCI) that directs operators to the site of faulted or forecasted faulted equipment, displays relevant real-time data from any type of equipment and provides data to assist with troubleshooting, and performs automatic checks to ensure resolution. Today, commercial building O&M staff principally utilize rule of thumb, intuition, physical tools, pen and paper, and in some cases, mobile maintenance work order systems. While data-driven maintenance has been championed in facilities such as manufacturing plants and data centers where revenue is tied directly to equipment uptime, there has been very little innovation to date in commercial real estate. To be clear, this innovation uses sensors and machine learning (ML) algorithms to gain access to specific machine health information and overlay it with immediacy and relevancy at the repair site. This is rich enough to support a variety of predictive analytics, technical risk is high in translating this data onto AR interfaces appropriate for this commercial field in a cost-effective and scalable way.

As explained above, in some embodiments, this disclosure enables a combination of equipment fault detection, across most equipment types, derived from real-time sensor data with an augmented reality experience for non-technical building operators. Prior studies have shown promising efficiency improvements, but required manufacturer specific protocols or control systems to achieve a result. Current solutions that detect anomalies in building operations often report volumes of raw data, charts and graphs. In context of a portfolio of buildings, this deluge of data is not actionable or even accessible to O&M staff out in field. This disclosure enables a capture of real-time data across a building and portfolio asset fleet in a universal manner; to disambiguate gigabytes of raw data into specific, real-world faults then visualize equipment data, location, and troubleshooting information onto an augmented representation of the specific mechanical area. For example, building operators spend their time in mechanical rooms, basements, and roofs of buildings. There is no time to sit behind a desktop to review analytics. As such, this technology enables providing targeted notifications and relevant 3D imaging to operators on the move. When an analytics engine discovers a drop in performance, equipment malfunction, or other anomaly, an email or SMS message will be sent directly to a building operator. There is at least basic details about that specific issue and a link to resolve the problem with an aid of AR experience. This link will bring users to a high level view of the property to help them orient towards the location of the equipment. Once in the mechanical room, operators can use the visualization to identify the specific piece of equipment experiencing a fault. The equipment will be dynamically tagged with real-time information around the fault and troubleshooting information, as well as details such as recent alerts, runtime hours since last maintenance, product specifications, current maintenance schedule, 3D models of the equipment, and vendor contact information.

As explained above, in some embodiments, this disclosure enables processing of real-time and historical electrical consumption data across a wide array of equipment assets to reveal actual or imminent equipment faults and optimization insights, and overlays dynamic information onto an AR visualization to streamline troubleshooting and resolution activities. This disclosure enables disambiguation of gigabytes of raw data into real-world conditions and then visualize relevant prescriptive and troubleshooting information in a way that improves the effectiveness of O&M staff. This disclosure uses sensors and machine learning algorithms to continuously assess machine health information and overlay that information with immediacy and relevancy at the repair site. Note that raw electrical demand and consumption data is not actionable for even the most experienced building operators. O&M staff work with their hands primarily; there is very little knowledge or training around equipment performance data, including electrical consumption. Operators are generally non-technical, too busy to perform data analyses on their own, and generally confident in their intuitive abilities. To be actionable, data must be translated into specific equipment faults and delivered to the field in real time. Equipment faults include common problems that building operators identify on a daily basis (motors requiring oil, belt tension issues, changing filters, calibrating air pressure, etc.), as well as those which are less visible to human senses and are often a precursor to critical equipment failure (short cycling, improper lead lag configurations, incidental shutdowns, internal component malfunction, etc.). The faults that are hidden from human senses can frustrate O&M staff. For example, short cycling occurs when a piece of equipment, such as a chiller plant, begins to rapidly cycle between high and low capacity. This disclosure enables employment of a kernel density estimation algorithms to define levels of operation of a piece of equipment (defined in kilowatts consumed). Short cycling has occurred when this cycling speeds up, often defined as eight times or more per hour. Short cycling degrades system performance over time and is often an indication that equipment failure is imminent, yet in almost impossible to identify with human senses. To collect real-time and long-term energy consumption data, this disclosure enables deployment of advanced meters (sometimes referred to as submeters) on electrical panels. Unlike utility meters, which record energy consumption for an entire building, submeters are deployed to track individual systems. Large commercial office and multifamily apartment buildings typically have one "master meter" tied to the utility company and a number of distribution and circuit panels. Distribution panels feed electricity to the largest equipment, such as boilers and chillers. The circuit panels feed smaller systems such as the lighting and exhaust fans. This disclosure can enables deployment of one meter per panel and monitor each circuit (e.g. within 42 per panel) with current transformers, which take multiple readings per second of active power (kW), power factor, current (A), and voltage (V). When deployed throughout a building, a dozen meters can monitor over 500 (or less or more) individual pieces of equipment. Raw data is streamed to the cloud on a continuous basis and stored locally for up to a month in case of disruptions to the network connection. "Tracing" and pattern recognition techniques are implemented in order to verify the correct mapping of circuit to equipment.

As explained above, in some embodiments, several techniques are deployed to identify data anomalies, including: group-level and equipment-level schedule detection using a non-parametric density estimator (for smoothing), a supervised classification algorithm based on the decision tree concept, data mining statistical methods that identifies patterns, regression models for weather normalization, recurrent neural networks for greater forecasting accuracy, and unsupervised anomaly detection algorithms. Fault detection alone is not innovative and there are unsolved issues with this strategy such as not knowing where equipment is located, not knowing how to troubleshoot effectively, and the friction between translating an abstract chart of data to real-world conditions. Visualizing equipment faults and other performance information using augmented reality will lead to dramatically improved results in commercial real estate operations. In most buildings, investigations are triggered when a tenant complains. Building operators must use their intuition to guess where to begin their investigation. With real-time data from sensors and an augmented reality overlay, the physical location of the faulty equipment will be evident to O&M staff. This is not trivial; in large buildings, there is mechanical equipment in the basement, approximately every four floors as well as the roof. Providing directions to the correct equipment room and highlighting the system experiencing the issue will dramatically reduce investigation time. When the operator has reached the correct piece of equipment, the field of vision will be augmented with relevant information to speed up the resolution process. The options to test include visualizing the real-time health of the machine, troubleshooting recommendations, equipment history, product specifications, maintenance manuals, and vendor contact information. When the issue is resolved, the augmented visualizations will reflect this and ask for feedback to further feed the ML algorithms to better refine the anomaly to fault detection mapping. To be clear, AR user interfaces are beginning to see success in training, task assistance and architectural/construction, but not operations and maintenance. To date, augmented reality applications have been sophisticated, but ultimately host all the required data and information in the program itself. This works perfectly well for training purposes, but that is not what is needed for O&M. The older generation of building operators are retiring and the younger generation will need to learn on the job. What is needed is real-time data embedded in the augmented reality experience so that day-to-day activities can be optimized. Feeding an AR application with real-time sensor data is a novel concept, especially for commercial real estate, which is behind the technology curve in general. As such, this disclosure enables a combination of several recent advances in disparate technologies: IOT sensors that can affordably capture real-time data from physical objects, ML algorithms that can discover anomalies in data and map anomalies to real-world conditions, and augmented reality applications that can render an area on mobile devices and/or wearable devices.

As explained above, in some embodiments, an alert can be delivered to an O&M worker (e.g. chief building engineer, superintendent, property manager, asset manager, director of operations, owner, field personnel, manager, subcontractor). The alert is associated with a physical area on a property. The augmented reality view of that location automatically opens to perform troubleshooting. An overlays of non-realtime, realtime and derived data is laid down to allow completion of troubleshooting or performance of routine preventive maintenance. An alert can be triggered by non-real-time or real time, or analytic/derived information. The triggering can be simple threshold triggered alerts, forecast triggered alerts, work order triggered alerts, scheduled maintenance alerts, fault prediction triggered alerts can bring the user directly to the intended site virtually and represent such real-time data in the view of the O&M staff member. Non real time information can be anything like (one or more of): photos, 3D views, equipment specifications/manuals, floor plans, mechanical layout diagrams, electrical riser diagrams, maintenance history/log books, work order records, subcontractor work history, checklists, associated parts lists (filters, belts, etc). Real time information can be anything like (one or more of): integration of live or pending work orders and their associated status, live camera feeds, real time sensor recorded data. Analytic/Derived information can be aggregated or time series sensor data, forecasts, predictions, analytics, maintenance schedules defined by non-real-time sources such as manuals. For example, a fault can be detected (such as a compressor short cycling, indicating imminent failure). This triggers a work order or alert to be created. The O&M worker completes the work and indicates completion of repair. The real time and derived data is then used to verify the resolution of the fault and verify the completion of work. The AR environment can combine maintenance and operations real-world location data that is overlaid with real-time, non-real time and derived (such as predictive) information coincident with the view of the location.

FIGS. 9-17 show various embodiments of user interfaces according to this disclosure. Any O&M staff member may view a location virtually and examine the real-time data (such as in diagram 0). A means to signal the equipment fault can be icons, highlights and other graphical elements may be used (such as the alert icon). Non-fault data may be represented by similar icons as well. In the event of an alert, an O&M staff member will be shown further information to facilitate investigation and resolution of the alert with real-time diagnostic or causative representations highlighted onto the view. (This can be electrical boxes or it can be equipment). Work orders may be treated as a type of real time representable data, except any completed work performed by the O&M staff member will be recorded to change the status and verified by the analytics to determine resolution of the fault. As such, this disclosure enables an ability to trigger off of one or more of the three types of O&M data and automatically direct the personnel to the precise virtual location and have the complete troubleshooting information overlaid along with *real time* data views also overlaid. The second thing the company desires to protect is the live repair feedback loop, where a completed maintenance/repair work order can be automatically verified using the real time and analytics derived data.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

The invention claimed is:

1. A method comprising:
populating, via a server, a user profile with a building identifier, a piece of equipment identifier, and a sensor identifier such that the building identifier is associated with the piece of equipment identifier in a one-to-many correspondence and the building identifier is associated with the sensor identifier in a one-to-many correspondence;
receiving, via the server, in real-time, a plurality of readings from a sensor monitoring a piece of equipment, wherein the sensor and the piece of equipment are stationary within a building, wherein the building identifier identifies the building, wherein the piece of equipment identifier identifies the piece of equipment, wherein the sensor identifier identifies the sensor;
populating, the via the server, in real-time, the user profile with the readings such that the readings are associated with the building identifier, the piece of equipment identifier, and the sensor identifier in the user profile, wherein the sensor is associated with the readings in a one-to-many correspondence;
identifying, via the server, in real-time, at least one of a present fault, projected fault, or a proposed maintenance in the piece of equipment based on the readings sourced from the user profile;
populating, via the server, in real-time, the user profile with the at least one of the present fault, the projected fault, or the proposed maintenance such that the piece of equipment identifier is associated with the at least one of the present fault, the projected fault, or the proposed maintenance in the user profile, wherein the piece of equipment identifier is associated with the at least one of the present fault, the projected fault, or the proposed maintenance in a one-to-many correspondence;
generating, via the server, in real-time, a message, wherein the message is informative of the at least one of the present fault, the projected fault, or the proposed maintenance, wherein the message is informative of a position of the piece of equipment based on the building identifier and the piece of equipment identifier;
sending, via the server, in real-time, the message to a mobile client accessing the user profile;
generating, via the server, a content related to information about the equipment responsive to a request received from the mobile client, wherein the content is generated based on the piece of equipment identifier, wherein the request is based on the message; and
sending, via the server, the content to the mobile client responsive to the request.

2. The method of claim 1, wherein the server identifies the present fault, wherein the content is related to the present fault.

3. The method of claim 1, wherein the server identifies the projected fault, wherein the content is related to the projected fault.

4. The method of any of claim 1, wherein the piece of equipment identifier is associated with the sensor identifier in at least one of a one-to-one correspondence or a one-to-many correspondence.

5. The method of claim 1, wherein the sensor monitors at least one of
an electric property of the piece of equipment,
a fluid property of the piece of equipment,
a heat property of the piece of equipment,
an acoustic property of the piece of equipment,
a vibrational property of the piece of equipment,
a position of the piece of equipment,
an optical property of the piece of equipment,
an ambient condition of the position,
an environmental condition in a vicinity of the position,
a presence of an environmental contaminant in a vicinity of the position,
a presence of a chemical in a vicinity of the position, or
an air property of the position.

6. The method of claim 1, wherein the sensor is physically attached to the piece of equipment.

7. The method of claim 1, wherein the sensor is not physically attached to the piece of equipment.

8. The method of claim 1, wherein the piece of equipment at least one of
inputs or outputs an electrical energy via a wire, wherein the sensor monitors the electrical energy or the wire,
inputs the electrical energy, wherein the sensor monitors the electrical energy,
outputs the electrical energy, wherein the sensor monitors the electrical energy,
inputs the electrical energy, wherein the sensor monitors the wire,
outputs the electrical energy, wherein the sensor monitors the wire,
inputs or outputs a fluid via a tube, wherein the sensor monitors the fluid or the tube,
inputs the fluid, wherein the sensor monitors the fluid,
outputs the fluid, wherein the sensor monitors the fluid,
inputs the fluid, wherein the sensor monitors the tube, or
outputs the fluid, wherein the sensor monitors the tube.

9. The method of any of claim 1, wherein the user profile is stored in an in-memory database.

10. The method of claim 1, wherein the server is a virtual server.

11. The method of claim 1, wherein the mobile client is an eyewear unit.

12. The method of claim 1, wherein the mobile client is a smartphone or a tablet.

13. The method of claim 1, wherein the position is within at least one of a mechanical room of the building, an electrical room of the building, or an elevator shaft of the building.

14. The method of claim 1, wherein the position is below ground.

15. The method of claim 1, wherein the position is above ground.

16. The method of claim 1, wherein the sensor is in electrical communication with the piece of equipment.

17. The method of claim 1, wherein the sensor is in fluid communication with the piece of equipment.

18. The method claim 1, wherein the sensor is attached to the building.

19. The method of claim 1, wherein the piece of equipment is attached to the building.

20. The method of claim 1, wherein the user profile includes a floor map such that the building identifier is associated with the floor map in a one-to-many correspondence, wherein the message contains the floor map or hyperlinks to the floor map, wherein the floor map includes a graphic associated with the piece of equipment identifier.

21. The method of claim 1, wherein the content includes a first graphic and a second graphic, wherein the first graphic is visually distinct from the second graphic, wherein the first graphic is associated with the present fault, wherein the second graphic is associated with the projected fault.

22. The method of claim 1, wherein the mobile client includes a camera, wherein the request is based on the camera imaging the piece of equipment.

23. The method of claim 1, wherein the readings are a plurality of first readings, and further comprising:
receiving, via the server, in real-time, a plurality of second readings from the sensor after the content is presented on the mobile client;
determining, via the server, in real-time, whether the piece of equipment is operating better based on the second readings relative to the first readings; and
taking, via the server, an action based on the piece of equipment operating better based on the second readings relative to the first readings.

24. The method of claim 1, wherein the readings are a plurality of first readings, and further comprising:
receiving, via the server, in real-time, a plurality of second readings from the sensor after the content is presented on the mobile client;
determining, via the server, in real-time, whether the piece of equipment is operating better based on the second readings relative to the first readings; and
taking, via the server, an action based on the piece of equipment not operating better based on the second readings relative to the first readings.

25. The method of claim 1, wherein the building has a dedicated network connection, wherein the sensor sends the readings over the dedicated network connection.

26. The method of claim 1, wherein the building has a dedicated network connection, wherein the mobile client receives the content over the dedicated network connection.

27. The method of claim 1, wherein the server is in communication with a client while the mobile client presents the content, wherein the client and the mobile device differ in access privileges or rights to the server.

28. The method of claim 1, wherein the information about the equipment includes information about the fault or the prospective fault, and information about the equipment specifications.

29. The method of claim 1, wherein the content includes augmented reality (AR) content.

30. The method of claim 1, wherein the mobile client is positioned in proximity of the position.

31. The method of claim 1, wherein the mobile client is positioned remote from the position.

32. The method of claim 1, wherein the server identifies the proposed maintenance, wherein the content is related to the projected fault.

33. The method of claim 1, wherein the mobile client is a portable computer or a notebook computer.

34. A method comprising:
populating, via a server, a user profile with a location identifier, a device identifier, and a sensor identifier such that the location identifier is associated with the device identifier in a one-to-many correspondence and the location identifier is associated with the sensor identifier in a one-to-many correspondence;
receiving, via the server, in real-time, a plurality of readings from a sensor monitoring a device, wherein the sensor and the device are positioned at a location, wherein the location identifier identifies the location, wherein the device identifier identifies the device, wherein the sensor identifier identifies the sensor;
populating, via the server, in real-time, the user profile with the readings such that the readings are associated with the location identifier, the device identifier, and the sensor identifier in the user profile, wherein the sensor is associated with the readings in a one-to-many correspondence;
identifying, via the server, in real-time, at least one of a present fault in, a projected fault in, or a recommended processing of the device based on the readings sourced from the user profile;
populating, via the server, in real-time, the user profile with the at least one of the present fault, the projected fault, or the recommended processing such that the device identifier is associated with the at least one of the present fault, the projected fault, or the recommended processing in the user profile, wherein the device identifier is associated with the at least one of the present fault, the projected fault, or the recommended processing in a one-to-many correspondence;

generating, via the server, in real-time, a message, wherein the message is informative of the at least one of the present fault, the projected fault, or the recommended processing, wherein the message is informative of a position of the device based on the location identifier and the device identifier;

sending, via the server, in real-time, the message to a mobile client accessing the user profile;

generating, via the server, a content related to information about the equipment responsive to a request received from the mobile client, wherein the content is generated based on the device identifier, wherein the request is based on the message; and sending, via the server, the content to the mobile client responsive to the request.

* * * * *